US012686741B2

(12) United States Patent
Lang et al.

(10) Patent No.: US 12,686,741 B2
(45) Date of Patent: Jul. 21, 2026

(54) PHOTOINDUCED-NONLINEAR-EXPANSION COORDINATION POLYMER AND PREPARATION METHOD THEREOF

(71) Applicant: SOOCHOW UNIVERSITY, Suzhou (CN)

(72) Inventors: Jianping Lang, Suzhou (CN); Zhanyong Yang, Suzhou (CN); Chunyan Ni, Yihuai (CN)

(73) Assignee: SOOCHOW UNIVERSITY, Suzhou (CN)

( * ) Notice: Subject to any disclaimer, the term of this patent is extended or adjusted under 35 U.S.C. 154(b) by 810 days.

(21) Appl. No.: 18/178,488

(22) Filed: Mar. 3, 2023

(65) Prior Publication Data

US 2023/0212349 A1 Jul. 6, 2023

Related U.S. Application Data

(63) Continuation-in-part of application No. PCT/CN2021/143121, filed on Dec. 30, 2021.

(30) Foreign Application Priority Data

Nov. 5, 2021 (CN) ......................... 202111306034.X

(51) Int. Cl.
*C08G 61/02* (2006.01)

(52) U.S. Cl.
CPC .................................... *C08G 61/02* (2013.01)

(58) Field of Classification Search
None
See application file for complete search history.

(56) References Cited

U.S. PATENT DOCUMENTS 11,976,087 B2 * 5/2024 Lang ......................... C07F 3/06
2017/0044428 A1 2/2017 Li et al.

FOREIGN PATENT DOCUMENTS

CN 108484928 A 9/2018
CN 109206444 A 1/2019
(Continued)

OTHER PUBLICATIONS

Lei et al. Synthesis, structure and two-photon absorption properties of a new multi-branched compound, 1,2,4,5-tetrakis(4-pyridylvinyl)benzene. Journal of Solid State Chemistry, vol. 177, Issue 11, 2004, pp. 4293-4299. (Year: 2004).*
(Continued)

*Primary Examiner* — Sanza L. McClendon
(74) *Attorney, Agent, or Firm* — SZDC Law PC

(57) ABSTRACT

The invention provides a photoinduced-nonlinear-expansion coordination polymer and preparation method thereof. The coordination polymer has a chemical formula of [Zn(iba)(tkpvb)Cl]$_{n1}$, wherein iba represents p-iodobenzoate, tkpvb represents 1,2,4,5-tetrakis((E)-2-(4-pyridyl)vinyl)benzene, and n=3000-60000; and crystallographic parameters of: (1) crystal system: monoclinic system; (2) space group: Cc; (3) a=28.6156(16) Å, b=7.2901(4) Å, c=21.5157(13) Å, β=127.430(4)°, and V=3574.2(4) Å$^3$; (4) Z=4; and (5) F(000)=1680, $R_1$=0.1363, $wR_2$=0.3788, and GOF=1.620; wherein iba represents p-iodobenzoate, tkpvb represents 1,2,4,5-tetrakis((E)-2-(4-pyridyl)vinyl)benzene, and n1=3000-60000. The preparation method of the coordination polymer of the present invention is simple, and has mild reaction conditions, and fast light conversion rate. Moreover, the coordination polymer undergoes an addition reaction, exhibits the photoinduced nonlinear expansion performance of the material, and affords a corresponding isomeric
(Continued)

compound under the irradiation of light of various wavelengths.

10 Claims, 7 Drawing Sheets

(56) References Cited

FOREIGN PATENT DOCUMENTS

| | | |
|---|---|---|
| CN | 109705024 A | 5/2019 |
| CN | 109705027 A | 5/2019 |
| CN | 113929920 A | 1/2022 |

OTHER PUBLICATIONS

Gong, WJ., Yang, ZY., Hong, YX et al. Tetraolefin stereospecific photodimerization and photopolymerization in coordination polymers. Sci. China Chem. 65, 1867-1872 (2022) (Year: 2022).*

Gu et al. Luminescent Zn(II) Coordination Polymers for Highly Selective Sensing of Cr(III) and Cr(VI) in Water. Inorganic Chemistry 2017, 56, 8, 4668-4678 (Year: 2017).*

Liu et al. Synthesis, crystal structures and two-photon absorption properties of a series of terpyridine-based chromophores. Dyes and Pigments, vol. 95, Issue 1, 2012, pp. 149-160. (Year: 2012).*

Yang et al. Assembly of a Zn(ii) coordination polymer of tetrapyridyl tetraene ligands for selective sensing of CrO42− and Fe3+ in water via luminescence quenching and enhancement. CrystEngComm, 2022,24, 1564-1572 (Year: 2022).*

Hu et al. A Zn(ii) coordination polymer and its photocycloaddition product: syntheses, structures, selective luminescence sensing of iron(iii) ions and selective absorption of dyes. Dalton Trans., 2015,44, 18795-18803 (Year: 2015).*

Gong et al. Luminescent cadmium(ii) coordination polymers of 1,2,4,5-tetrakis(4-pyridylvinyl)benzene used as efficient multi-responsive sensors for toxic metal ions in water. Dalton Trans., 2017,46, 16861-16871. (Year: 2017).*

* cited by examiner

PHOTOINDUCED-NONLINEAR-EXPANSION COORDINATION POLYMER AND PREPARATION METHOD THEREOF

The present application is Continuation-In-Part Application of PCT/CN2021/143121, filed on Dec. 30, 2021, which CN 202111306034.X, filed on Nov. 5, 2021, which is incorporated by reference for all purposes as if fully set forth herein.

FIELD OF THE INVENTION

The present invention relates to the technical field of photosensitive materials, and specifically to a photoinduced-nonlinear-expansion coordination polymer and a preparation method thereof.

DESCRIPTION OF THE RELATED ART

When some flexible materials receive external stimuli, their own structures change dynamically, causing macroscopically mechanical movement of the materials, such as bending, rotation, spring, and burst. These stimuli include pressure, heat, pH, guest molecules, light, and magnetic field. Such materials have great prospects of application in the fields of information storage/transmission, biomedical science, and artificial intelligence. Among numerous stimuli-responsive materials, light-responsive materials have the advantages of contactlessness, adjustable stimulus intensity, quick response and others, making such materials have great application potential. To facilitate the control of the direction of the response to improve the performance of such materials, it is particularly important to observe the relationship between the macroscopic changes and the internal structural changes. Generally, when a flexible material (interior) responds to external physical or chemical signals, the internal breakage and recombination of chemical bonds and rotation between aromatic rings are generally accompanied (see: Mochizuki S, Ogiwara N, Takayanagi M, Nagaoka M, Kitagawa S, Uemura T, *Nat. Commun,* 2019, 9, 329).

Modern applied materials not only have to exhibit good physical properties but also exhibit controllable expansion. Controllable expansion will undoubtedly increase the stability and service life of the materials. At present, examples of thermal expansion have been reported with materials such as zeolite, metal cyanide, and coordination polymers (see: Burtch, N. C., S. J. Baxter, J. Heinen, A. Bird, A. Schneemann, D. Dubbeldam, A. P. Wilkinson, *Adv. Funct. Mater,* 2019, 29, 1904669). However, light-controlled expansion materials are rarely reported. It is well known that the wavelength and power of incident light can be controlled manually. This also lays a solid foundation for precisely controlling the expansion of light-responsive materials. Many photomechanical actuators (PMAs) can be designed based on the properties of light-controlled expansion of materials. PMAs are smart materials able to change their macroscopic shape through external light stimuli to complete some mechanical behaviors (push, pull, grab, and lift). By inserting a photoresponsive unit into the backbone of a coordination polymer to have highly ordered arrangement, the mechanism of internal changes can be well studied when the material is induced to expand under light (see: Y. X. Shi, W. H. Zhang, B. F. Abrahams, P. Braunstein, J. P. Lang, *Angew. Chem. Int. Ed.,* 2019, 58 (28), 9453-9458). Apparently, such light-controlled expansion or memory materials have important prospects of application in light-responsive devices and molecular mechanical actuators.

Therefore, the design and synthesis of a new, high-sensitivity solid-state photoinduced nonlinear expansion material is of great significance in photo-actuated electronic micro-devices and biomimetic materials.

SUMMARY OF THE INVENTION

To solve the above problems, the present invention provides a photoinduced-nonlinear-expansion coordination polymer and a preparation method thereof. The preparation method of the coordination polymer is simple, and has mild reaction conditions, and fast light conversion rate.

According to the technical solution of the present invention, the photoinduced-nonlinear-expansion coordination polymer is a bright yellow bulk crystal and has a molecular formula of $C_{41}H_{31}ClN_4O_2Zn$, a chemical formula of $[Zn(iba)(tkpvb)Cl]_{n1}$ (represented by Zn-1 hereinafter), and crystallographic parameters of:

(1) crystal system: monoclinic system;

(2) space group: Cc;

(3) a=28.6156(16) Å, b=7.2901(4) Å, c=21.5157(13) Å, β=127.430(4)°, and V=3574.2(4) $Å^3$;

(4) Z=4; and (5) F(000)=1680, $R_1$=0.1363, $wR_2$=0.3788, and GOF=1.620;

wherein iba represents p-iodobenzoate, tkpvb represents 1,2,4,5-tetrakis((E)-2-(4-pyridyl)vinyl)benzene, and n1=3000-60000. The chemical structures of iodobenzoate and 1,2,4,5-tetrakis((E)-2-(4-pyridyl)vinyl)benzene are respectively as shown by Formulas (II) and (III):

(II)

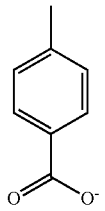

(III)

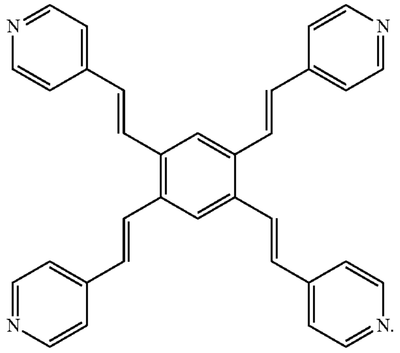

Specifically, the photoinduced-nonlinear-expansion coordination polymer has $D_c$ of 1.558/g·$cm^{-3}$, μ of 1.668 (Mo-Kα)/$mm^{-1}$; total number of diffraction point of 23221, and number of independent diffraction points of 7244.

In a second aspect, the present invention provides a method for preparing the photoinduced-nonlinear-expansion coordination polymer. The method includes the following steps:

dissolving zinc nitrate hexahydrate, p-iodobenzoic acid or a water-soluble salt thereof, and 1,2,4,5-tetrakis((E)-2-(4-pyridyl)vinyl)benzene in a mixed solvent of N,N'-dimethylformamide and water, adjusting the pH to 5-6, and reacting to obtain the photoinduced-nonlinear-expansion coordination polymer.

Preferably, the molar ratio of zinc nitrate hexahydrate, p-iodobenzoic acid or a water-soluble salt thereof and 1,2,4,5-tetrakis((E)-2-(4-pyridyl)vinyl)benzene is 1-2.5:1-2.5:1-2.5, and preferably 1:1:1.

Preferably, the reaction raw materials are zinc nitrate hexahydrate, p-iodobenzoic acid and 1,2,4,5-tetrakis((E)-2-(4-pyridyl)vinyl)benzene.

Preferably, the reaction temperature is 120 to −125° C., and the time is 5-12 hrs.

Preferably, the reaction temperature is 120° C., and the reaction time is 6 hrs.

Preferably, the volume ratio of N,N'-dimethylformamide and water in the mixed solvent is 1:1-4, and preferably, 2:3.

Preferably, the pH is adjusted to 5-6 with hydrochloric acid having a concentration of 0.1 M. Preferably, the pH is adjusted to 5.

The photoinduced-nonlinear-expansion coordination polymer of the present invention exhibits a photoinduced nonlinear expansion behavior and affords a series of isomeric compounds under irradiation with a light source having a wavelength of 365-500 nm. Under irradiation with a light source having a wavelength of 450 nm, the a-axis of the unit cell and the unit cell volume V reach the maximum degrees of expansion, which are 2.20% and 2.02%, respectively.

Therefore, in a third aspect, the present invention provides an isomer of the photoinduced-nonlinear-expansion coordination polymer, which is obtained by irradiating the photoinduced-nonlinear-expansion coordination polymer with a light source having a wavelength of 365-500 nm. The isomeric compound has a molecular formula of $C_{41}H_{31}ClN_4O_2Zn$, a general chemical formula of [Zn (iba) (poly-bpbpvpcb)Cl]$_{n3}$ (represented by Zn-2n hereinafter), where n3=3000-60000, and poly-bpbpvpcb represents poly-1,3-bis(4-pyridyl)-(2,5-bis(2-(4-pyridyl)-vinyl) phenyl)cyclobutane, and a structure of Formula (I):

(I)

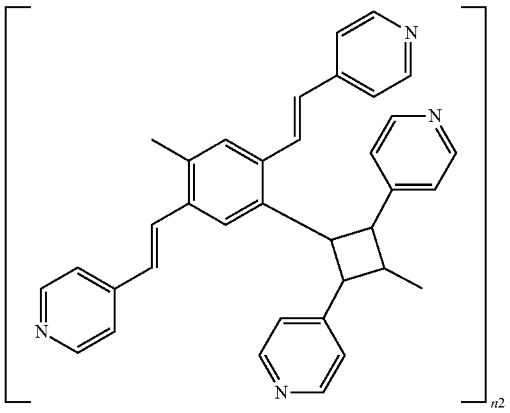

where n2=3000-60000.

Preferably, in the preparation method of the isomer, when irradiated under a light source, 1,2,4,5-tetrakis((E)-2-(4-pyridyl)vinyl)benzene arranged in the coordination polymer Zn-1 in the b-axis of the unit cells undergoes [2+2]cycloaddition reaction, to produce poly-1,3-bis(4-pyridyl)-(2,5-bis(2-(4-pyridyl)-vinyl)phenyl)cyclobutane of Formula (I). As a result, all the one-dimensional segments stacked in the b-axis are connected to form a two-dimensional network structure.

Preferably, the light source has a wavelength of 500 nm, 475 nm, 450 nm, 420 nm, 400 nm, 380 nm or 365 nm. A coordination polymer having a chemical formula [Zn (iba) (poly-bpbpvpcb)Cl]$_{n3}$ is obtained, and these materials are respectively designated as Zn-2a, Zn-2b, Zn-2c, Zn-2d, Zn-2e, Zn-2f and Zn-2g.

In a first aspect, the present invention provides a method for preparing a polycyclobutane derivative of Formula (I) (poly-1,3-bis(4-pyridyl)-(2,5-bis(2-(4-pyridyl)-vinyl)phenyl)cyclobutane). The method comprises the following steps: irradiating the photoinduced-nonlinear-expansion coordination polymer according to the present invention with a light source having a wavelength of 365-500 nm, to obtain a product A; and treating the product A with a strong acid, and then neutralizing, to obtain the polycyclobutane derivative.

Preferably, the strong acid is selected from the group consisting of concentrated hydrochloric acid, concentrated sulfuric acid, concentrated nitric acid and any combination thereof, and more preferably concentrated hydrochloric acid.

Preferably, the solution was adjusted to 6.0-8.0 with 0.5-1.5 mol/L sodium hydroxide, and then extracted with dichloromethane, to obtain a new high-molecular-weight polymer poly-1,3-bis(4-pyridyl)-(2,5-bis(2-(4-pyridyl)-vinyl)phenyl)cyclobutane.

The present invention further provides a polycyclobutane derivative prepared by the method as described above.

Compared with the prior art, the technical solution of the present invention has the following advantages:

1. A new coordination polymer is prepared in the present invention, which undergoes an [2+2] addition reaction under irradiation with light of various wavelengths, to afford a series of photoinduced-nonlinear-expansion isomeric compounds. The preparation method of the coordination polymer is simple, and has mild reaction conditions, and fast light conversion rate. The expansion performance of the material can be accurately adjusted.
2. The means of photoinduced nonlinear expansion in the present invention are non-contact type and damage type, the volume adjustment is highly accurate, and the whole adjustment process does not require any chemical reagents, and is safe and reliable.
3. In the present invention, the coordination polymer (Zn-2n) containing a polycyclobutane derivative is acidolyzed by a strong acid, to obtain a corresponding polycyclobutane derivative (poly-1,3-bis(4-pyridyl)-(2,5-bis(2-(4-pyridyl)-vinyl)phenyl)cyclobutane). Apure photochemical product can be obtained after simple stirring, neutralization, extraction, separation, and drying. The reaction conversion rate is high, and Hiba can be recycled after acidolysis, conforming the concept of green chemistry.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Example 1: Preparation of Coordination Polymer $[Zn(Iba)(Tkpvb)Cl]_{n1}$

A mixture of zinc nitrate hexahydrate (297 mg, 0.1 mmol), 1,2,4,5-tetrakis((E)-2-(4-pyridyl)vinyl)benzene (490 mg, 0.1 mmol) and p-iodobenzoic acid (248 mg, 0.1 mmol) was added to a 25 mL of thick-walled pressure flask. Then 10 mL of a mixed solution of N,N'-dimethyl formamide and deionized water at a volume ratio of 2:3 was added, and the system was adjusted to about pH 5 with 0.1 M hydrochloric acid. The flask was sealed, ultrasonically dispersed for 10 min, heated for 8 hrs in an oven at a temperature programmed to 120° C., and then naturally cooled to room temperature, to obtain a bright yellow lump crystal $[Zn(iba)(tkpvb)Cl]_{n1}$ (Zn-1). The crystal was washed with ethanol, the collected, and dried in an oven at 60° C. Yield: 462.8 mg (65%, calculated based on 1,2,4,5-tetrakis((E)-2-(4-pyridyl)vinyl)benzene).

Elemental analysis (%): $C_{41}H_{30}ClIN_4O_2Zn$; Calculated: C, 58.73, H, 3.61, N, 6.68; Found: C, 58.73; H, 3.60, N, 6.65.

Infrared spectrum (potassium bromide disc method): 3964 (w), 2648 (w), 1697 (w), 1415 (w), 1389 (s), 1304 (m), 1257 (s), 1195 (w), 914 (m), 748 (m) $cm^{-1}$.

Figure 3:
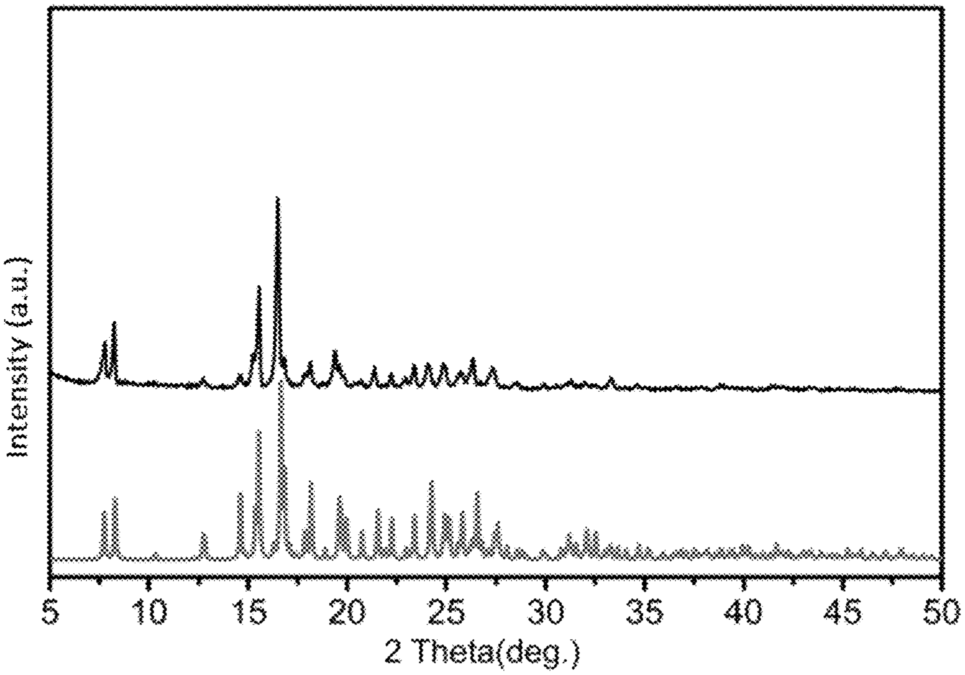
FIG. 3 shows a X-ray powder diffraction pattern of Compound $[Zn(iba)(tkpvb)Cl]_{n1}$ in Example 1.
Figure 4:
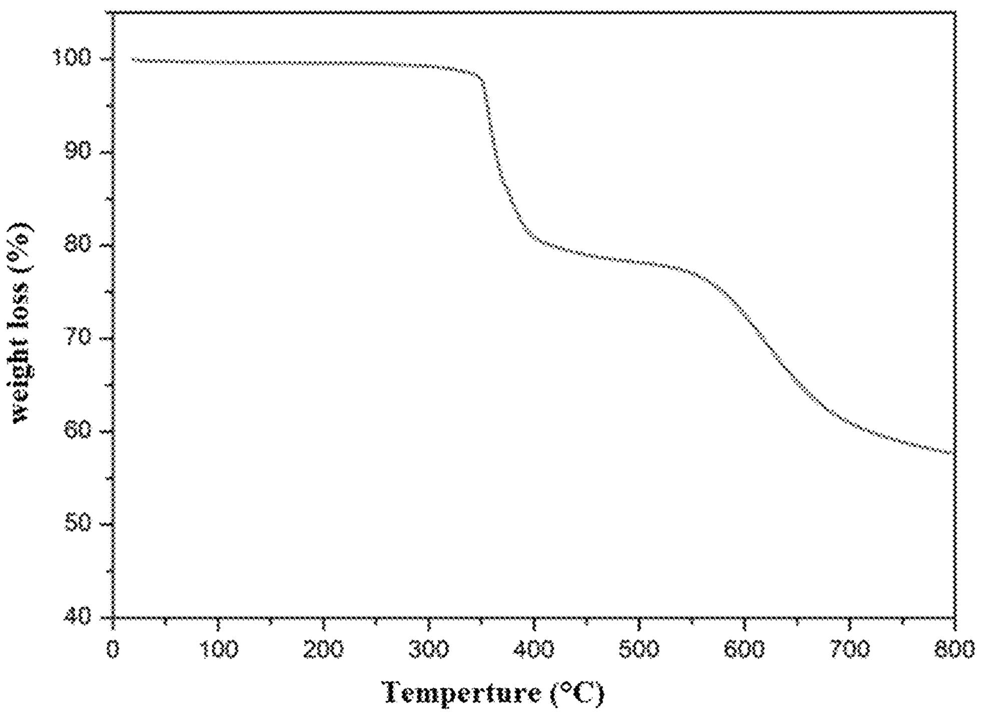
FIG. 4 shows a thermogravimetric analysis profile of Compound $[Zn(iba)(tkpvb)Cl]_{n1}$ in Example 1.

The structure of the compound was characterized by single crystal X-ray diffraction, powder X-ray diffraction and thermogravimetric analysis. The crystallographic parameters are listed in Table 1. The X-ray powder diffraction pattern and thermogravimetric analysis profile are shown in FIGS. 3 and 4.

TABLE 1

| Crystallographic parameters of the coordination polymer of Example 1 | |
|---|---|
| Compounds | Zn-1 |
| Molecular formula | $C_{41}H_{30}ClIN_4O_2Zn$ |
| Molecular weight | 838.42 |
| Temperature | 119.98 |
| Crystal system | Monoclinic |
| Space group | Cc |
| a/Å | 28.6156(16) |
| b/Å | 7.2901(4) |
| c/Å | 21.5757(13) |
| α/° | 90 |
| β/° | 127.430(4) |
| γ/° | 90 |
| V/Å$^3$ | 3574.2(4) |
| Dc/g cm − 3 | 1.558 |
| Z | 4 |
| μ (Mo-Kα)/mm$^{-1}$ | 1.668 |
| Total number of diffraction points | 23221 |
| Number of independent diffraction points | 7244 |
| F(000) | 1680 |
| $R_1{}^a$ | 0.1363 |
| $wR_2{}^b$ | 0.3788 |
| GOF$^c$ | 1.620 |

Figure 1:
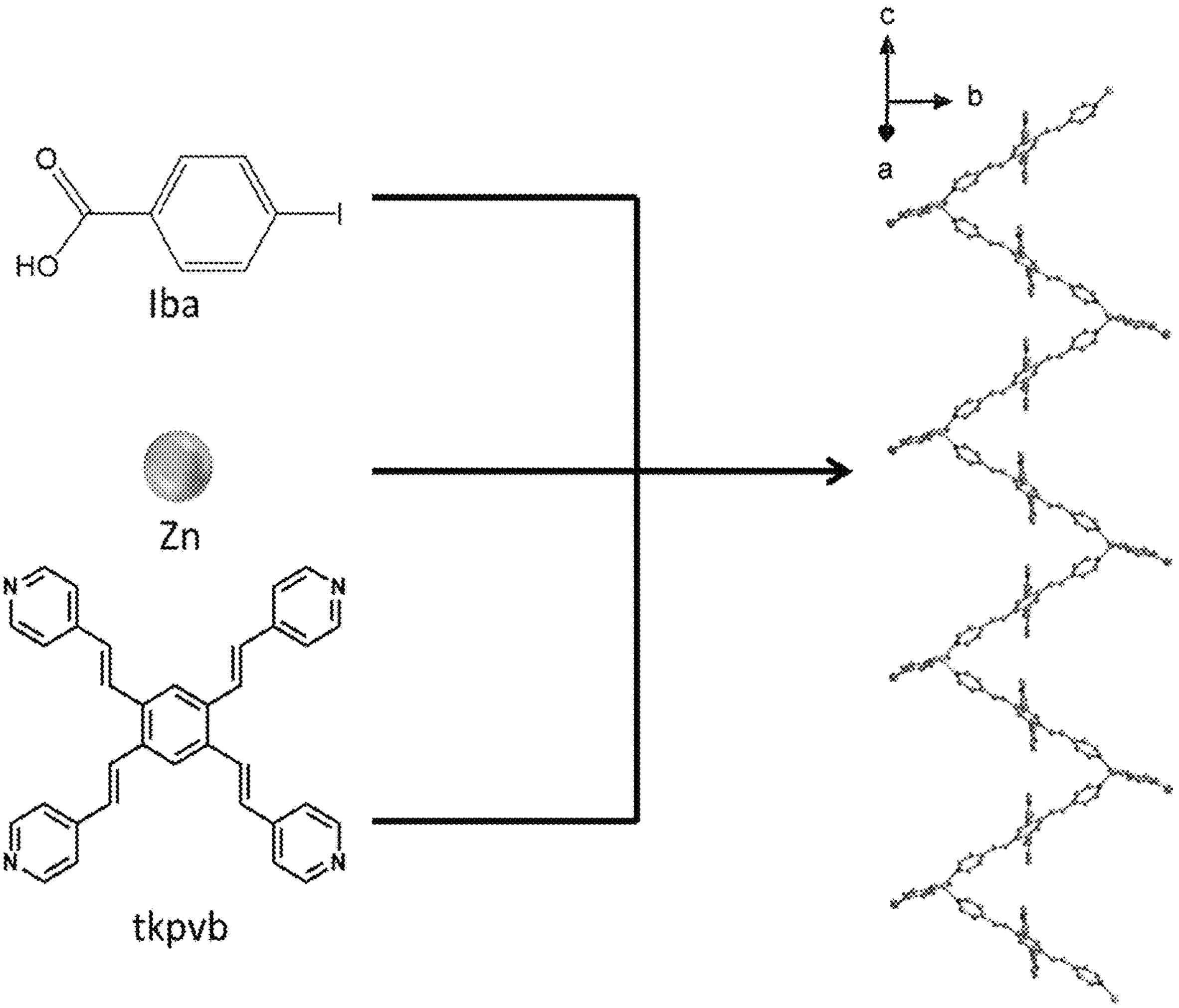
FIG. 1 is a schematic diagram showing the synthesis of Compound [Zn(iba)(tkpvb)Cl]$_{n1}$ in Example 1.
Figure 2:
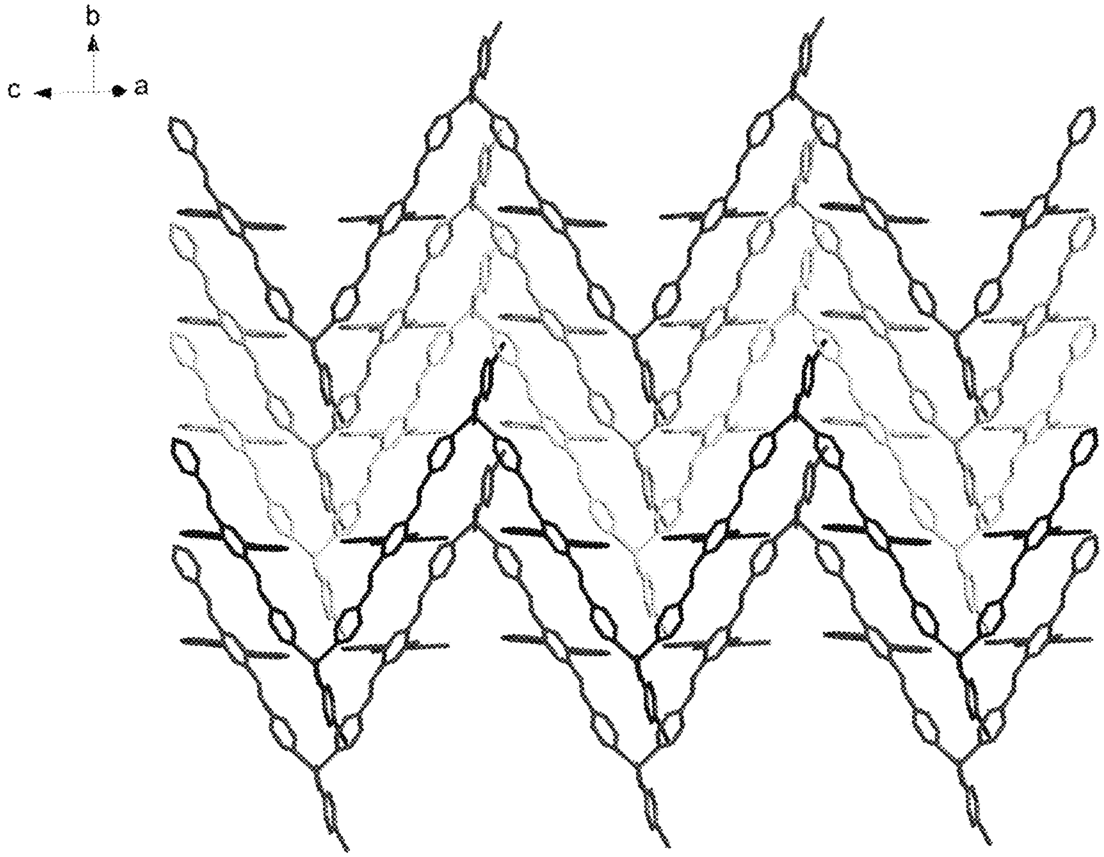
FIG. 2 shows the one-dimensional stacking of Compound [Zn(iba)(tkpvb)Cl]$_{n1}$ in Example 1.

The compound is monoclinic, and the space group is Cc. FIGS. 1-2 schematically show the synthesis and the spatial structure of Compound Zn-1. As can be seen, the central metal ion in the above coordination polymer containing an alkene ligand is $Zn^{2+}$, which is coordinated with O in one p-iodobenzoic acid molecule, Cl in hydrochloric acid and N in the two tkpvb ligand molecules. The metal ions are bridged by the tkpvb ligand, and extend to form a one-dimensional chain-like structure.

Example 2: Preparation of Coordination Polymer $[Zn(Iba)(Poly\text{-}Bpbpvpcb)Cl]_{n3}$ (Zn-2a)

At room temperature, a small amount of Zn-1 crystal was placed on a clean glass slide, and irradiated with an LED light having a wavelength of 365 nm for 30 min while a distance of 2 cm was maintained between the light source and the crystal to obtain a [2+2]cycloaddition product $[Zn(iba)(poly\text{-}bpbpvpcb)Cl]_{n3}$ (Zn-2a) with a conversion rate of 100%.

Elemental analysis (%): $C_{41}H_{30}ClIN_4O_2Zn$; Calculated: C, 58.73, H, 3.61, N, 6.68; Found: C, 58.77; H, 3.59; N, 6.66.

Infrared spectrum (potassium bromide disc method): 3440 (w), 3066 (w), 2938 (w), 2359 (w), 1938 (w), 1824 (w), 1640 (s), 1504 (m), 1393 (s), 1223 (w), 1032 (m), 919 (w), 881 (m), 821 (s), 745 (s), 688 (m), 546 (s) $cm^{-1}$.

Figure 5:
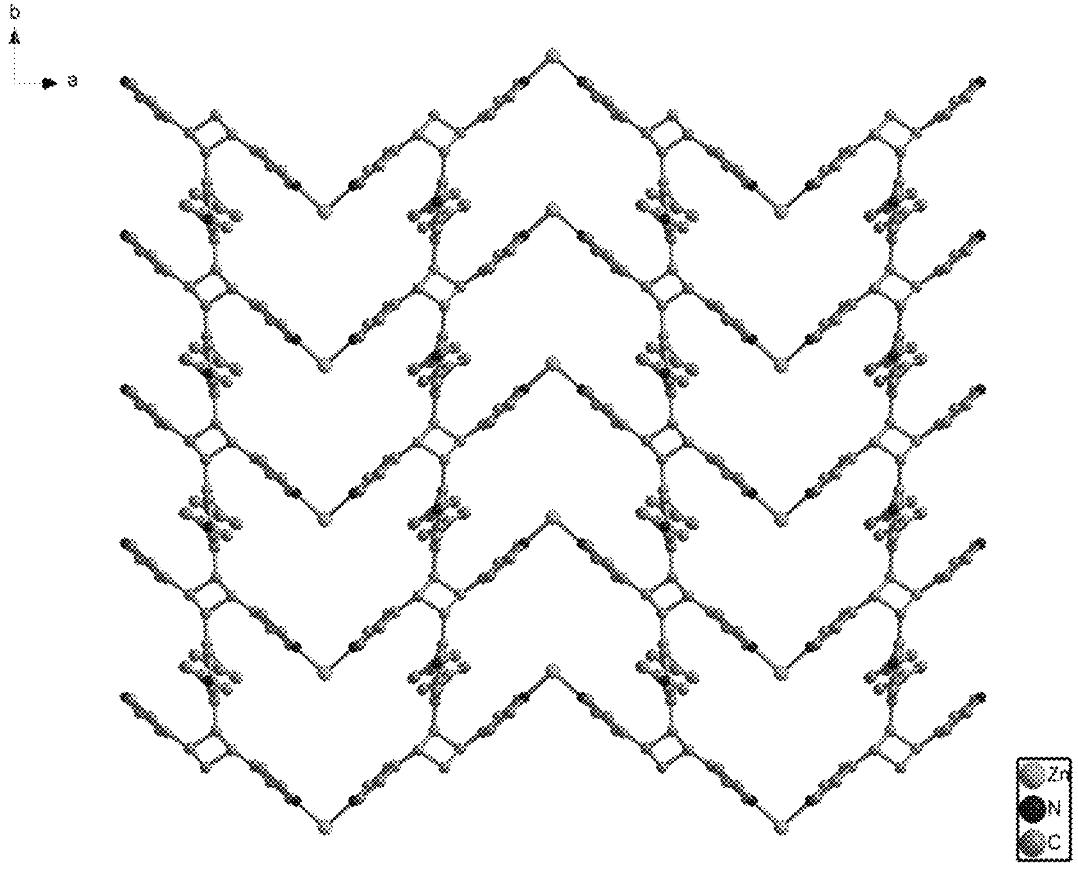
FIG. 5 shows a two-dimensional structure of Compound $[Zn(iba)(poly\text{-}bpbpvpcb)Cl]_{n3}$ (Zn-2a) in Example 2.
Figure 6:
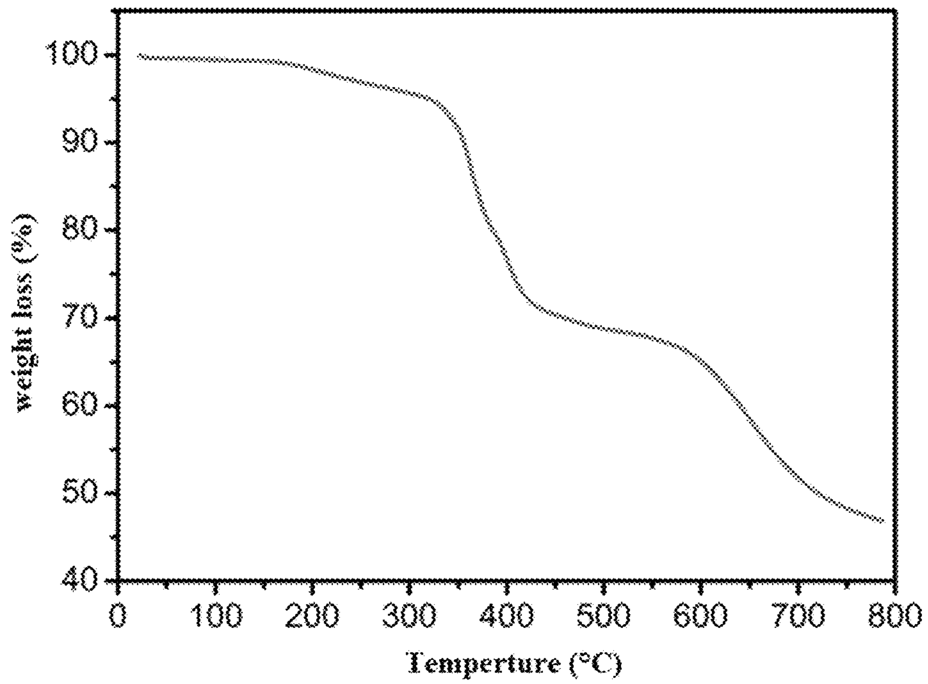
FIG. 6 shows thermogravimetric analysis profile of Compound $[Zn(iba)(poly\text{-}bpbpvpcb)Cl]_{n3}$ (Zn-2a) in Example 2.

The product was tested by single crystal X-ray diffraction. The crystallographic parameters are listed in Table 2. The single crystal structure is shown in FIG. 5.

Example 3: Preparation of Coordination Polymer $[Zn(Iba)(Poly\text{-}Bpbpvpcb)Cl]_{n3}$ (Zn-2b)

At room temperature, a small amount of Zn-1 crystal was placed on a clean glass slide, and irradiated with an LED light having a wavelength of 385 nm for 30 min while a distance of 2 cm was maintained between the light source and the crystal to obtain a [2+2]cycloaddition product $[Zn(iba)(poly\text{-}bpbpvpcb)Cl]_{n3}$ (Zn-2b) with a conversion rate of 100%.

Elemental analysis (%): $C_{41}H_{30}ClIN_4O_2Zn$; Calculated: C, 58.73, H, 3.61, N, 6.68; Found: C, 58.73, H, 3.63, N, 6.64.

The product was tested by single crystal X-ray diffraction. The crystallographic parameters are listed in Table 2.

Example 4: Preparation of Coordination Polymer [Zn(Iba)(Poly-Bpbpvpcb)Cl]$_{n3}$ (Zn-2c)

At room temperature, a small amount of Zn-1 crystal was placed on a clean glass slide, and irradiated with an LED light having a wavelength of 400 nm for 30 min while a distance of 2 cm was maintained between the light source and the crystal to obtain a [2+2]cycloaddition product [Zn (iba)(poly-bpbpvpcb)Cl]$_{n3}$ (Zn-2c) with a conversion rate of 100%.

Elemental analysis (%): $C_{41}H_{30}ClIN_4O_2Zn$; Calculated: C, 58.73, H, 3.61, N, 6.68; Found: C, 58.70, H, 3.52, N, 6.67.

The product was tested by single crystal X-ray diffraction. The crystallographic parameters are listed in Table 2.

Example 5: Preparation of Coordination Polymer [Zn(Iba)(Poly-Bpbpvpcb)Cl]$_{n3}$ (Zn-2d)

At room temperature, a small amount of Zn-1 crystal was placed on a clean glass slide, and irradiated with an LED light having a wavelength of 420 nm for 30 min while a distance of 2 cm was maintained between the light source and the crystal to obtain a [2+2]cycloaddition product [Zn (iba)(poly-bpbpvpcb)Cl]$_{n3}$ (Zn-2d) with a conversion rate of 100%.

Elemental analysis (%): $C_{41}H_{30}ClIN_4O_2Zn$; Calculated: C, 58.73, H, 3.61, N, 6.68; Found: C, 58.77, H, 3.69, N, 6.65.

The product was tested by single crystal X-ray diffraction. The crystallographic parameters are listed in Table 2.

Example 6: Preparation of Coordination Polymer [Zn(Iba)(Poly-Bpbpvpcb)Cl]$_{n3}$ (Zn-2e)

At room temperature, a small amount of Zn-1 crystal was placed on a clean glass slide, and irradiated with an LED light having a wavelength of 450 nm for 30 min while a distance of 2 cm was maintained between the light source and the crystal to obtain a [2+2]cycloaddition product [Zn (iba)(poly-bpbpvpcb)Cl]$_{n3}$ (Zn-2e) with a conversion rate of 100%.

Elemental analysis (%): $C_{41}H_{30}ClIN_4O_2Zn$; Calculated: C, 58.73, H, 3.61, N, 6.68; Found: C, 58.74, H, 3.64, N, 6.69.

The product was tested by single crystal X-ray diffraction. The crystallographic parameters are listed in Table 2.

Example 7: Preparation of Coordination Polymer [Zn(iba)(poly-bpbpvpcb)Cl]$_{n3}$ (Zn-2f)

At room temperature, a small amount of Zn-1 crystal was placed on a clean glass slide, and irradiated with an LED light having a wavelength of 475 nm for 30 min while a distance of 2 cm was maintained between the light source and the crystal to obtain a [2+2]cycloaddition product [Zn (iba)(poly-bpbpvpcb)Cl]$_{n3}$ (Zn-2f) with a conversion rate of 100%.

Elemental analysis (%): $C_{41}H_{30}ClIN_4O_2Zn$; Calculated: C, 58.73, H, 3.61, N, 6.68; Found: C, 58.77, H, 3.55, N, 6.68.

The product was tested by single crystal X-ray diffraction. The crystallographic parameters are listed in Table 2.

Example 8: Preparation of Coordination Polymer [Zn(Iba)(Poly-Bpbpvpcb)Cl]$_{n3}$ (Zn-2g)

At room temperature, a small amount of Zn-1 crystal was placed on a clean glass slide, and irradiated with an LED light having a wavelength of 500 nm for 30 min while a distance of 2 cm was maintained between the light source and the crystal to obtain a [2+2]cycloaddition product [Zn (iba)(poly-bpbpvpcb)Cl]$_{n3}$ (Zn-2g) with a conversion rate of 100%.

Elemental analysis (%): $C_{41}H_{30}ClIN_4O_2Zn$; Calculated: C, 58.73, H, 3.61, N, 6.68; Found: C, 58.71; H, 3.64, N, 6.66.

The products obtained in Examples 2 to 8 were tested by single crystal X-ray diffraction. The crystallographic parameters are listed in Table 2.

TABLE 2

Crystallographic parameters of the coordination polymer of Examples 2 to 8

| Compounds | Zn-2a | Zn-2b | Zn-2c | Zn-2d |
|---|---|---|---|---|
| Molecular formula | $C_{41}H_{30}ClIN_4O_2Zn$ | $C_{41}H_{30}ClIN_4O_2Zn$ | $C_{41}H_{30}ClIN_4O_2Zn$ | $C_{41}H_{30}ClIN_4O_2Zn$ |
| Molecular weight | 838.41 | 838.41 | 838.41 | 838.41 |
| Crystal system | Monoclinic | Monoclinic | Monoclinic | Monoclinic |
| Space group | Cc | Cc | Cc | Cc |
| a/Å | 29.113(19) | 29.144(3) | 29.1283(19) | 29.1610(17) |
| b/Å | 7.298(5) | 7.2990(7) | 7.3059(5) | 7.3081(3) |
| c/Å | 21.452(13) | 21.4760(18) | 21.5428(14) | 21.5547(12) |
| α/° | 90 | 90 | 90 | 90 |
| β/° | 127.257(11) | 127.317(2) | 127.360(2) | 127.3910(10) |
| γ/° | 90 | 90 | 90 | 90 |
| V/Å$^3$ | 3628(4) | 3633.2(6) | 3643.9(4) | 3649.6(3) |
| Z | 4 | 4 | 4 | 4 |
| $D_c$/(g cm$^{-3}$) | 1.535 | 1.533 | 1.525 | 1.526 |
| μ (Mo-Kα)/ mm$^{-1}$ | 1.643 | 1.641 | 1.635 | 1.633 |
| F(000) | 1680 | 1680 | 1676 | 1680 |
| Total number of diffraction points | 25927 | 15217 | 47717 | 23605 |
| Number of independent | 7465 | 6448 | 8436 | 5853 |

TABLE 2-continued

| Crystallographic parameters of the coordination polymer of Examples 2 to 8 | | | | |
|---|---|---|---|---|
| diffraction points | | | | |
| $R_{int}$ | 0.0824 | 0.077 | 0.1049 | 0.0536 |
| $R_1{}^a$ | 0.1021 | 0.1037 | 0.1773 | 0.1108 |
| $wR_2{}^b$ | 0.2657 | 0.2695 | 0.4359 | 0.2938 |
| $GOF^c$ | 1.094 | 1.107 | 1.766 | 1.357 |

| Compounds | Zn-2e | Zn-2f | Zn-2g |
|---|---|---|---|
| Molecular formula | $C_{41}H_{30}ClIN_4O_2Zn$ | $C_{41}H_{30}ClIN_4O_2Zn$ | $C_{41}H_{30}ClIN_4O_2Zn$ |
| Molecular weight | 838.41 | 838.41 | 838.41 |
| Crystal system | Monoclinic | Monoclinic | Monoclinic |
| Space group | Cc | Cc | Cc |
| a/Å | 29.199(11) | 29.248 | 29.222(8) |
| b/Å | 7.321(3) | 7.322 | 7.3096(19) |
| c/Å | 21.560(7) | 21.53 | 21.520(6) |
| α/° | 90 | 90 | 90 |
| β/° | 127.283(13) | 127.37 | 127.377(12) |
| γ/° | 90 | 90 | 90 |
| $V/Å^3$ | 3667(2) | 3664.4 | 3652.8(18) |
| Z | 4 | 4 | 4 |
| $D_c/(g\ cm^{-3})$ | 1.519 | 1.52 | 1.525 |
| μ (Mo-Kα)/ $mm^{-1}$ | 1.625 | 1.627 | 1.632 |
| F(000) | 1680 | 1680 | 1680 |
| Total number of diffraction points | 20847 | 66338 | 29005 |
| Number of independent diffraction points | 7786 | 8398 | 7410 |
| $R_{int}$ | 0.0635 | 0.0744 | 0.0566 |
| $R_1{}^a$ | 0.0912 | 0.1044 | 0.11 |
| $wR_2{}^b$ | 0.2356 | 0.2861 | 0.2909 |
| $GOF^c$ | 1.04 | 1.352 | 1.365 |

Example 9: Photo-Induced Nonlinear Expansion Behavior

Figure 8:
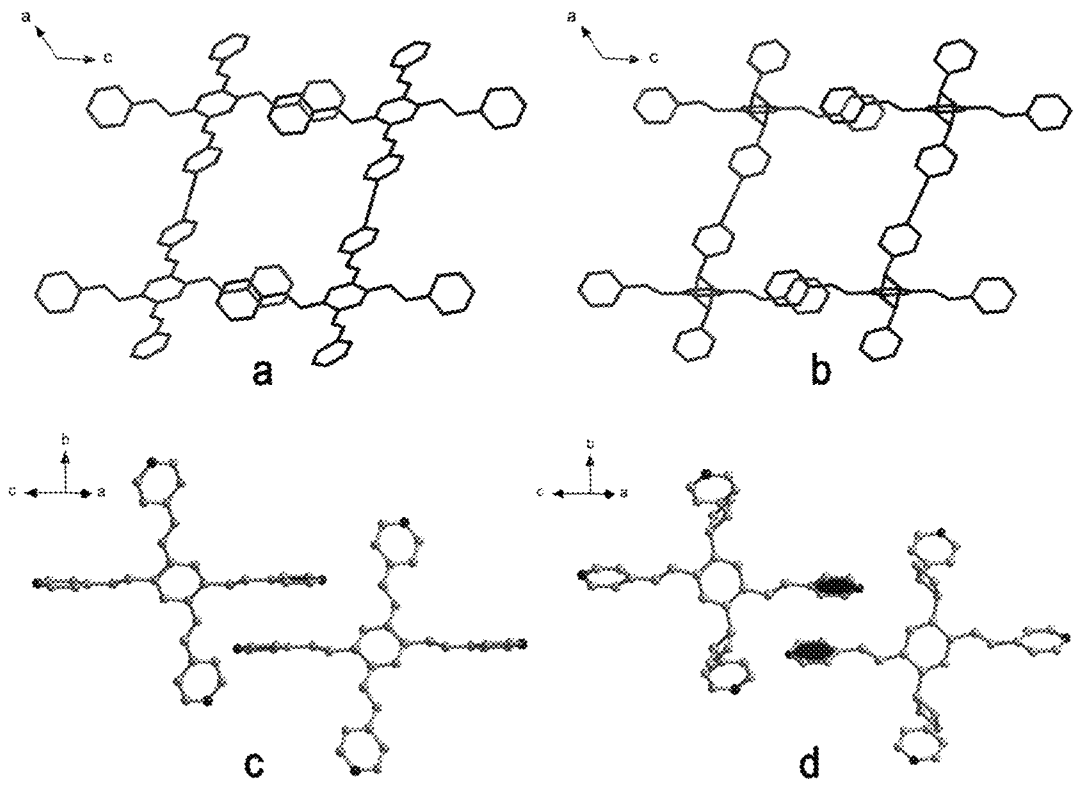
FIG. 8 shows the photoinduced changes of the pyridine ring and benzene ring in the tkpvb ligand in Example 9.
Figure 9:
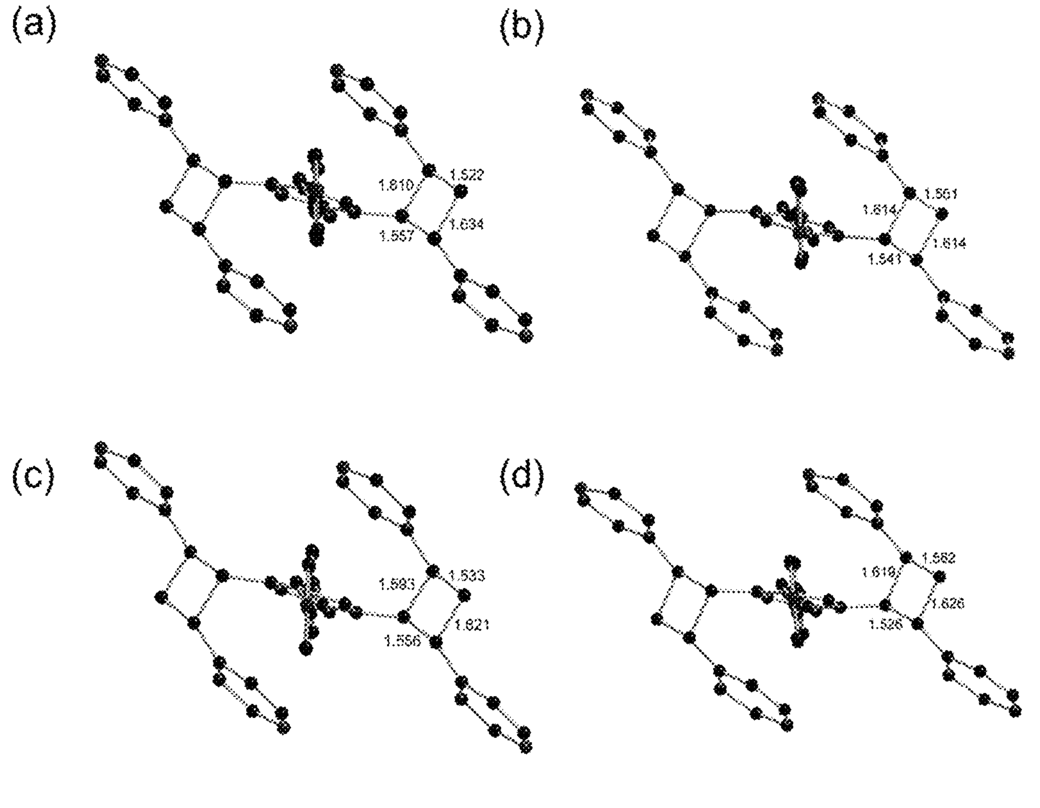
FIG. 9 shows the change in structure of the polycyclobutane derivative poly-bpbpvpcb formed in Example 9.
Figure 10:
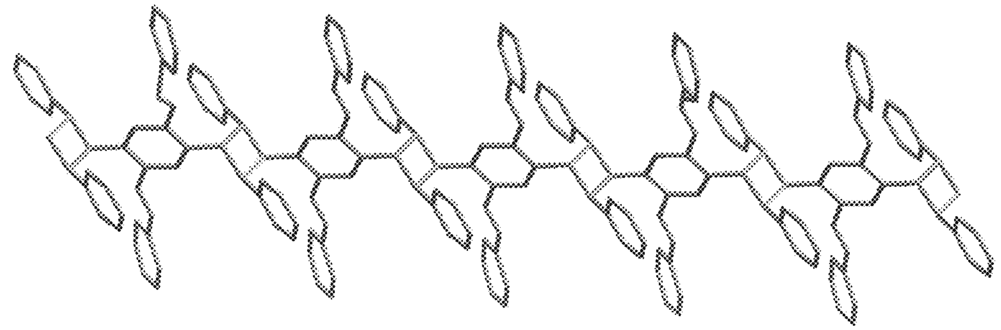
FIG. 10 is a schematic diagram showing the structure of the polycyclobutane derivative poly-bpbpvpcb in Example 10.
Figure 11:
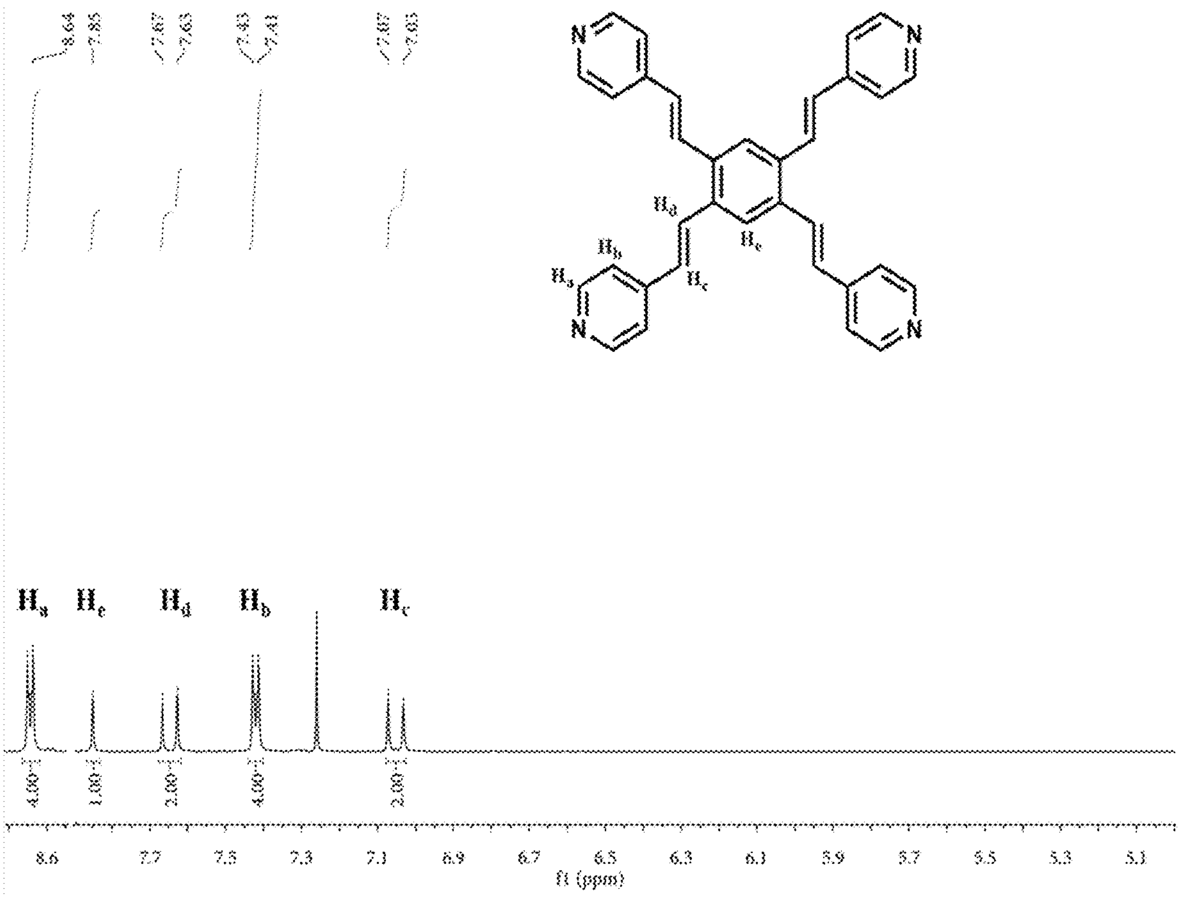
FIG. 11 shows a $^1$H NMR spectrum of tkpvb in Example 10.
Figure 12:
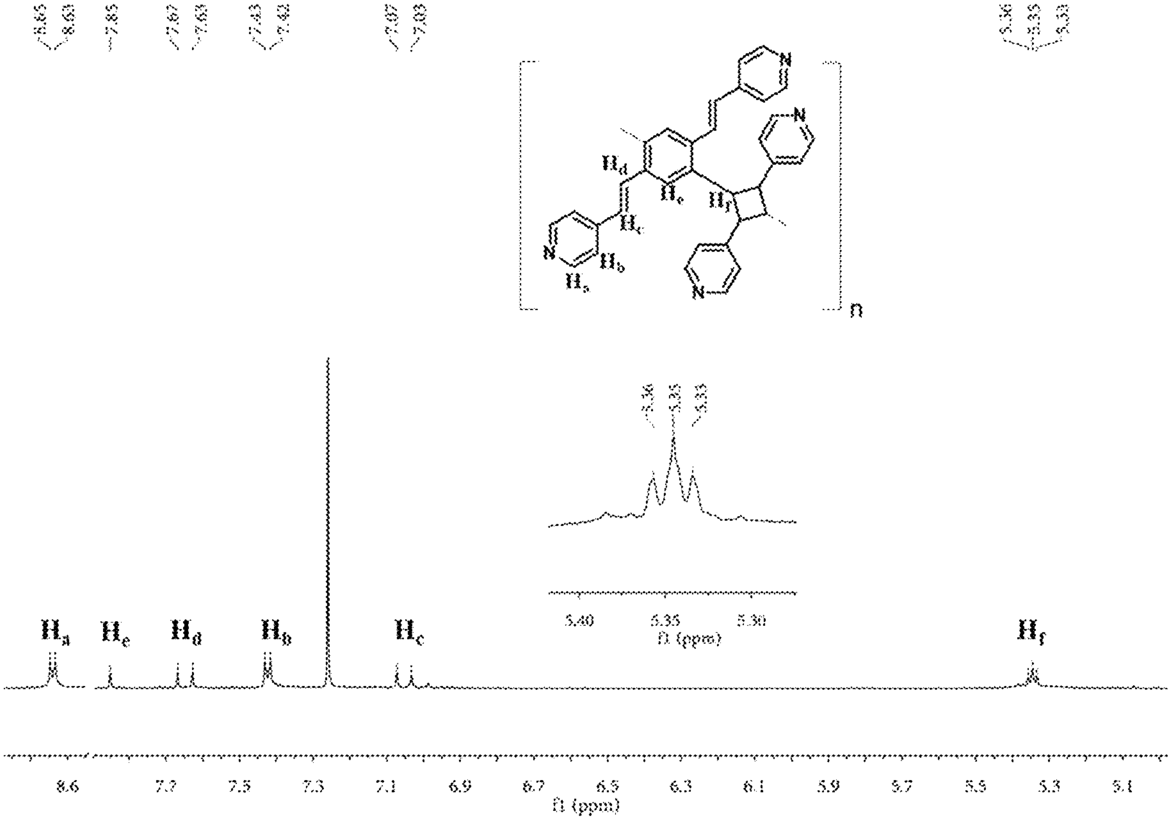
FIG. 12 shows a $^1$H NMR spectrum of the polycyclobutane derivative poly-bpbpvpcb in Example 10.

The method was the same as that in Examples 2 to 8, where the coordination polymer from Example 1 was irradiated with light of various wavelengths (500 nm, 475 nm, 450 nm, 420 nm, 400 nm, 380 nm or 365 nm), to obtain a series of coordination polymers [Zn(iba)(poly-bpbpvpcb)Cl]$_{n3}$ (Zn-2n, n=a-g) capable of nonlinear expansion. Some unit cell parameters of these compounds exhibit a nonlinear expansion behavior. FIG. 8 schematically shows the photoinduced expansion.

Figure 7:
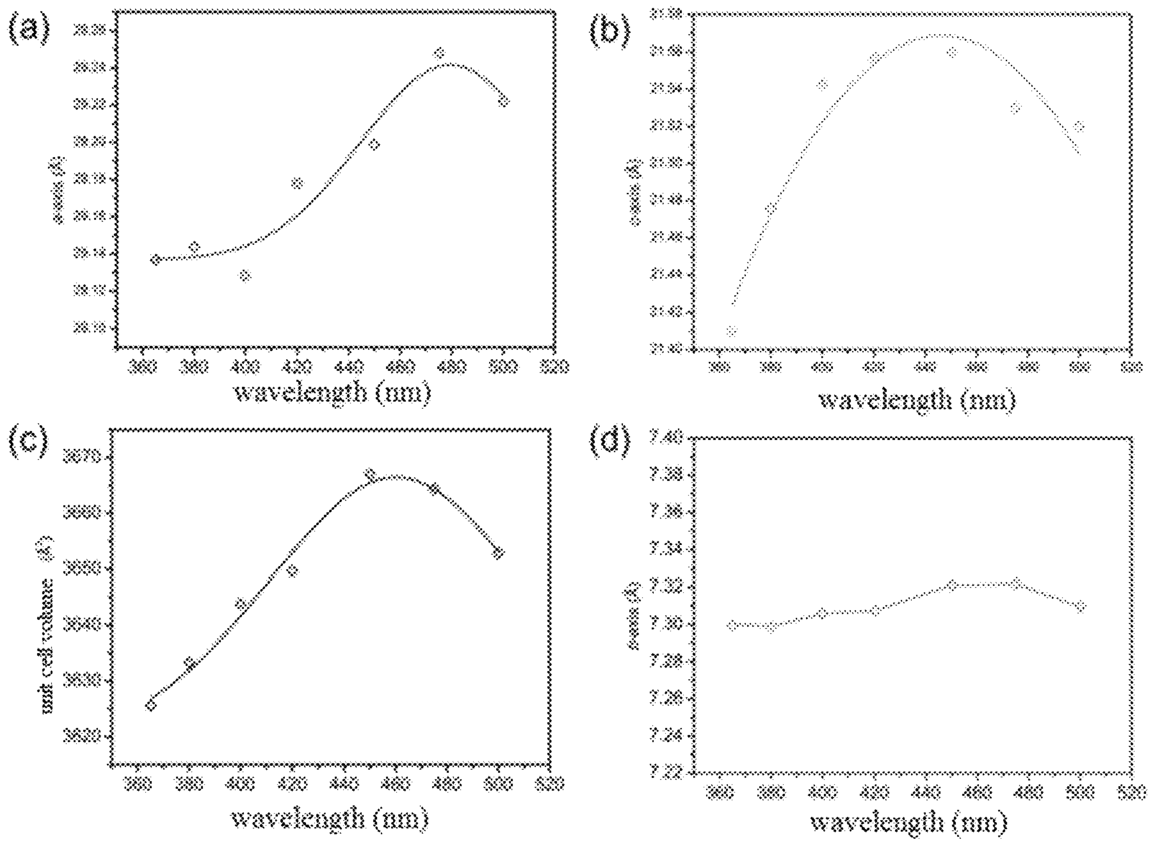
FIG. 7 shows the photoinduced changes of the parameters a axis, b axis, c axis, and volume V of the unit cell in Example 9.

As shown in FIG. 7, after being irradiated with light having a wavelength of 365-500 nm, the unit cell parameters of the crystals show different trends. The length of the b-axis of the unit cell remains basically unchanged; the length of the a-axis and c-axis of the unit cell and the unit cell volume V all show a nonlinear expansion trend; and under irradiation with light having a wavelength of 450 nm, the unit cell volume V reaches the maximum degree of expansion. The analysis of the single crystal structure by single crystal X-ray diffraction reveals that this photoinduced nonlinear expansion phenomenon is mainly attributed to the difference in the absorption and conversion of photons by the compound, causing the changes in the compound structure to different degrees after irradiation with light. The central benzene ring in tkpvb rotates clockwise or counterclockwise upon the photochemical reaction, leading to the rotation of the attached pyridine ring (see FIG. 8). Based on the experimental test data, the fitted Formulas (1), (2), and (3) are used to represents the relationships between the lengths of the a-axis and c-axis of the unit cell and the unit cell volume V and the wavelength (λ) of light for irradiation:

$$a=\omega_1+\omega_2\times\exp(-0.5\times((\lambda-\omega_4)/\omega_3)^2 \qquad \text{Formula (1)}$$

where the value of $\omega_1$, $\omega_2$, $\omega_3$ and $\omega_4$ are respectively 29.1367 Å, 0.1051 Å, 34.6278 $nm^2$ and 479.3353 nm.

$$c=\omega_1+\omega_2\times\exp(-0.5\times((\lambda-\omega_4)/\omega_3)^2 \qquad \text{Formula (2)}$$

where the value of $\omega_1$, $\omega_2$, $\omega_3$ and $\omega_4$ are respectively −3338.8508 Å, 3360.4198 Å, 8721.2263 $nm^2$ and 446.1376 nm.

$$V=\omega_1+\omega_2\times\exp(-0.5\times((\lambda-\omega_4)/\omega_3)^2 \qquad \text{Formula (3)}$$

where the value of $\omega_1$, $\omega_2$, $\omega_3$ and $\omega_4$ are respectively 3971.94 $Å^3$, 147.31 $Å^3$, 61.22 $m^2$ and 438.46 nm.

Figure 13:
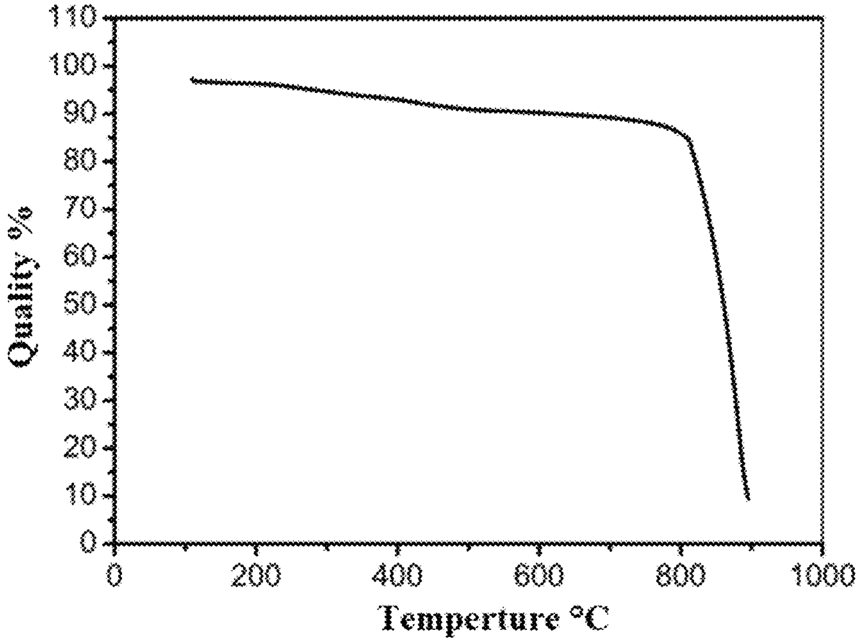
FIG. 13 shows a thermogravimetric analysis profile of the polycyclobutane derivative poly-bpbpvpcb in Example 10.

Example 10: Synthesis and Characterization of Polycyclobutane Derivative Poly-bpbpvpcb 200 mg of Compound Zn-2a was added to a flask, 10 mL of concentrated hydrochloric acid was added and stirred for 24 hrs, and then neutralized to pH=7 with 1 mol/L sodium hydroxide. 20 mL of dichloromethane was then added and stirred for 3 hrs. After rotary evaporation, poly-bpbpvpcb as a light yellow powder was obtained, with a yield of 92%. The $^1H$ NMR of poly-bpbpvpcb is shown in FIG. 13.

$^1H$ NMR (400 MHz, $CDCl_3$): δ 8.65 (d, J=4.0 Hz, 4H), 7.85 (s, 1H), 7.65 (d, J=16.0 Hz, 2H), 7.42 (d, J=8 Hz, 4H), 7.05 (d, J=16.0 Hz, 2H), 5.35 (d, J=12.0 Hz, 2H).

The poly-bpbpvpcb was tested by thermogravimetric analysis. The results are shown in FIG. 13. It can be seen that the material has good thermal stability below 800° C., and can be used as a new heat-resistant material.

Obviously, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A photoinduced-nonlinear-expansion coordination polymer, wherein the coordination polymer is a bright yellow bulk crystal and has a chemical formula of [Zn(iba)(tkpvb)Cl]$_{n1}$ and crystallographic parameters of:

(1) crystal system: monoclinic system;

(2) space group: Cc;

(3) a=28.6156(16) Å, b=7.2901(4) Å, c=21.5157(13) Å, β=127.430(4)°, and V=3574.2(4) $Å^3$;

(4) Z=4; and (5) F(000)=1680, $R_1$=0.1363, $wR_2$=0.3788, and GOF=1.620;

wherein iba represents p-iodobenzoate, tkpvb represents 1,2,4,5-tetrakis((E)-2-(4-pyridyl)vinyl)benzene, and n1=3000-60000.

2. A method for preparing a photoinduced-nonlinear-expansion coordination polymer according to claim 1, comprising the following steps:

dissolving zinc nitrate hexahydrate, p-iodobenzoic acid or a water-soluble salt thereof, and 1,2,4,5-tetrakis((E)-2-(4-pyridyl)vinyl)benzene in a mixed solvent of N,N'-dimethylformamide and water, adjusting the pH to 5-6, and reacting to obtain the photoinduced-nonlinear-expansion coordination polymer.

3. The preparation method according to claim 2, wherein the molar ratio of zinc nitrate hexahydrate, p-iodobenzoic acid or a water-soluble salt thereof and 1,2,4,5-tetrakis((E)-2-(4-pyridyl)vinyl)benzene is 1-2.5:1-2.5:1-2.5.

4. The preparation method according to claim 2, wherein the reaction temperature is 120 to −125° C., and the time is 5-12 h.

5. The preparation method according to claim 2, wherein the volume ratio of N,N'-dimethylformamide and water in the mixed solvent is 1:1-1:4.

6. An isomer of the photoinduced-nonlinear-expansion coordination polymer according to claim 1, wherein the isomer is obtained by irradiating the photoinduced-nonlinear-expansion coordination polymer with a light source having a wavelength of 365-500 nm.

7. The isomer according to claim 6, wherein the light source having a wavelength of 500 nm, 475 nm, 450 nm, 420 nm, 400 nm, 380 nm or 365 nm.

8. A method for preparing a polycyclobutane derivative, having a chemical formula shown by Formula (I):

(I)

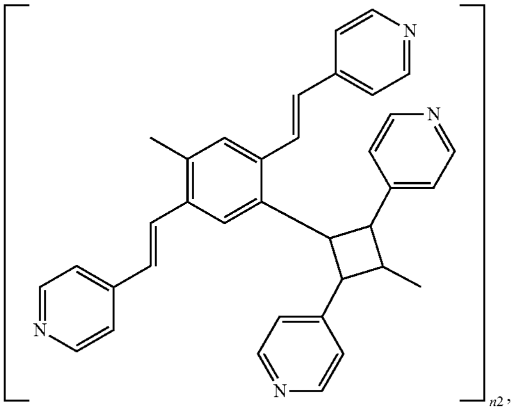

wherein n2=3000-60000, the method comprising: irradiating the photoinduced-nonlinear-expansion coordination polymer according to claim 1 with a light source having a wavelength of 365-500 nm, to obtain a product A; and treating the product A with a strong acid, and then neutralizing, to obtain the polycyclobutane derivative.

9. The method for preparing a polycyclobutane derivative according to claim 8, wherein the strong acid is selected from the group consisting of concentrated hydrochloric acid, concentrated sulfuric acid, concentrated nitric acid and any combination thereof.

10. A polycyclobutane derivative prepared by the method according to claim 8.

* * * * *